United States Patent [19]
Nishioka et al.

[11] Patent Number: 4,988,468
[45] Date of Patent: Jan. 29, 1991

[54] METHOD FOR PRODUCING NON-REDUCIBLE DIELECTRIC CERAMIC COMPOSITION

[75] Inventors: Goro Nishioka; Shuuji Watanabe; Yukio Sakabe, all of Nagaokakyo, Japan

[73] Assignee: Murata Manufacturing Co., Ltd., Japan

[21] Appl. No.: 141,999

[22] Filed: Jan. 6, 1988

[30] Foreign Application Priority Data

| | | | |
|---|---|---|---|
| Jan. 8, 1987 | [JP] | Japan | 62-2996 |
| Jan. 8, 1987 | [JP] | Japan | 62-2997 |
| Jan. 8, 1987 | [JP] | Japan | 62-2998 |
| Jan. 8, 1987 | [JP] | Japan | 62-2999 |
| Jan. 8, 1987 | [JP] | Japan | 62-3000 |
| Mar. 6, 1987 | [JP] | Japan | 62-52602 |

[51] Int. Cl.$^5$ .............................................. C04B 35/46
[52] U.S. Cl. ......................................... 264/65; 264/61; 501/137
[58] Field of Search ................ 264/65, 61; 501/102, 501/104, 137

[56] References Cited

U.S. PATENT DOCUMENTS

| | | | |
|---|---|---|---|
| 4,115,493 | 9/1978 | Sakabe et al. | 264/61 |
| 4,582,814 | 4/1986 | Thomas | 264/61 |
| 4,700,269 | 10/1987 | Kishi et al. | 264/65 |

FOREIGN PATENT DOCUMENTS 61-19005  1/1986  Japan .

*Primary Examiner*—James Derrington
*Attorney, Agent, or Firm*—Ostrolenk, Faber, Gerb & Soffen

[57] ABSTRACT

A method for producing non-reducible dielectric ceramics of the kind comprising a basic composition of a three component system $BaTiO_3$-$CaTiO_3$-$CaZrO_3$ or a four component system $BaTiO_3$-$CaTiO_3$-$CaZrO_3$-$MgTiO_3$ and containing additives composed of at least manganese oxide and silicon dioxide. The method comprises the steps of separately preparing calcined powders of at least three perovskite compounds including $BaTiO_3$, $CaTiO_3$ and $CaZrO_3$, mixing the calcined powders to prepare a mixture for a basic composition, adding additives composed of at least manganese oxide and silicon dioxide to the mixtures for the basic composition, and then firing the resultant mixture in a reducing atmosphere. One of the oxides, magnesium oxide, calcium oxide, strontium oxide and barium oxide is additionally incorporated into the mixture for the basic composition together with manganese oxide and silicon dioxide.

16 Claims, No Drawings

METHOD FOR PRODUCING NON-REDUCIBLE DIELECTRIC CERAMIC COMPOSITION

FIELD OF THE INVENTION

This invention relates to a method for producing non-reducible dielectric ceramics. More particularly, it relates to a method for producing non-reducible dielectric ceramics used as a dielectric material for monolithic ceramic capacitors.

BACKGROUND OF THE INVENTION

In general, monolithic or multi layer type ceramic capacitors are widely used in electronic circuits of various electronic devices such as, for example, electronic computers, communications devices, television receiving sets, electronic timepieces, radio receivers and the like because of their large capacitance-size ratio and high reliability. As a dielectric material for such monolithic capacitors, there have widely been used dielectric ceramics of a barium titanate system.

One of the disadvantages of the barium titanate dielectric ceramics is that they are deoxidized when fired under the low partial pressure of oxygen, resulting in considerable decrease in specific resistance. For this reason, the barium titanate dielectric ceramics must be fired in an atmosphere with a high partial pressure of oxygen such as, for example, in air. In addition, these dielectric ceramics have a high sintering temperature of 1300° to 1400° C.

When producing monolithic ceramic capacitors with such barium titanate dielectric ceramics, a material for internal electrodes of the capacitors are necessarily required to meet the following conditions: Firstly, it does not melt or evaporate at the sintering temperature of the ceramic dielectrics. Secondly, it does not oxidize and does not react with dielectrics in the sintering atmosphere. These requirements are fully met by a noble metal such as, for example, platinum or palladium. The use of such noble metals however prevents reduction of the production cost.

To solve these problems, there have been proposed various non-reducible dielectric ceramics such as, for example, calcium-zirconium-modified barium titanate, in Japanese patent publication No. 56-46641 (corresponding to U.S. Pat. No. 4,115,493) and Japanese patent laid-open No. 61-19005. These non-reducible dielectric ceramics are not reduced even when fired in a reducing atmosphere, thus making it possible to use base metals as a material for internal electrodes of monolithic ceramic capacitors.

U.S. Pat. No. 4,115,493 discloses a method for producing non-reducible dielectric ceramics consisting essentially of a solid solution expressed by the formula:

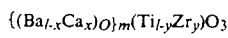

wherein the subscripts x, y and m take values within the following respective ranges: $1.005 \leq m \leq 1.03$, $0.02 \leq x \leq 0.22$, $0 < y < 0.20$. This method comprises the steps of mixing all the raw materials, calcining the resultant mixture in air at a temperature of 1100° to 1150° C., preparing dielectric ceramic green sheets with resultant calcined powder, applying conductive paste for internal electrodes to the green sheets, stacking and pressing the resultant green sheets to form a monolithic multi-layer unit, and then firing the stack at 1300° to 1400° C. in a reducing atmosphere. A similar method is disclosed in Japanese patent laid-open No. 61-19005.

However, the dielectric ceramics produced by such a method have a disadvantage that the change rate of dielectric constant on temperature is large. This results from the fact that the ceramic composition forms an uniform solid solution during sintering and has a single curie point.

SUMMARY OF THE INVENTION

It is therefore an object of the present invention to provide a method for producing a non-reducible dielectric ceramics which makes it possible to produce ceramic dielectrics with high specific resistance, high dielectric constant and small temperature change rate of dielectric constant.

Another object of the present invention is to provide a non-reducible dielectric ceramics having high specific resistant, high dielectric constant, small temperature change rate of dielectric constant and low dielectric loss.

The present invention is based on the fact that the temperature change rate of dielectric constant can be minimized by preventing components such as $ZrO_2$ and CaO from formation of uniform solid solution with $BaTiO_3$ during sintering.

According to the present invention, these objects are achieved by providing a method for producing non-reducible dielectric ceramics comprising a basic composition of a three component system $BaTiO_3$-$CaTiO_3$-$CaZrO_3$ or of a four component system $BaTiO_3$-$CaTiO_3$-$CaZrO_3$-$MgTiO_3$ and containing additives composed of at least manganese oxide and silicon dioxide, the method comprising the steps of separately preparing calcined powders of at least three perovskite compounds including $BaTiO_3$, $CaTiO_3$ and $CaZrO_3$, mixing said calcined powders to prepare a mixture for a basic composition, adding additives composed of at least manganese oxide and silicon dioxide to said mixture for the basic composition, and then firing the resultant mixture.

These and other objects, features and advantages of the present invention will be further apparent from the detailed description given hereinafter. It should be understood, however, that that detailed description and specific examples, while indicating preferred embodiments of the invention, are given by way of illustration only, since various changes and modifications within the spirit and scope of the invention will become apparent to those skilled in the art from this description.

DETAILED DESCRIPTION OF THE INVENTION

According to the present invention, there is provided a method for producing non-reducible dielectric ceramics of the kind consisting essentially of a basic composition of a ternary system $BaTiO_3$-$CaTiO_3$-$CaZrO_3$, and containing, as additives, manganese oxide and silicon dioxide, the method comprising the steps of separately preparing calcined powders of $BaTiO_3$, $CaTiO_3$ and $CaZrO_3$, mixing said calcined powders to prepare a mixture for a basic composition consisting essentially of 82.0 to 93.0 mole % of $BaTiO_3$, 6.0 to 14.0 mole % of $CaTiO_3$ and 1.0 to 8.0 mole % of $CaZrO_3$, adding manganese oxide and silicon dioxide as additives to said mixture for the basic composition, the respective added amounts of said additives per 100 parts by mole of said mixture for the basic composition being 0.1 to 4.0 parts by mole for manganese oxides in terms of $MnO_2$, and 0.1 to 3.0 parts by mole for silicon dioxide, and firing the resultant mixture in a reducing atmosphere.

In this method, barium titanate is so prepared that it has a molar ratio of BaO to $TiO_2$, i.e., $BaO/TiO_2$ within the range of 1.002 to 1.05.

According to a preferred embodiment of the present invention, there is provided a method for producing non-reducible dielectric ceramics of the kind consisting essentially of a basic composition of a three component system $BaTiO_3$-$CaTiO_3$-$CaZrO_3$, and containing, as additives, manganese oxide, silicon dioxide and magnesium oxide, the method comprising the steps of separately preparing calcined powders of $BaTiO_3$, $CaTiO_3$ and $CaZrO_3$, mixing said calcined powders to prepare a mixture for a basic composition consisting essentially of 82.0 to 93.0 mole % of $BaTiO_3$, 6.0 to 14.0 mole % of $CaTiO_3$ and 1.0 to 8.0 mole % of $CaZrO_3$, adding of manganese oxide, silicon dioxide and magnesium oxide as additives to said mixture for the basic composition, the respective added amounts of said additives per 100 parts by mole of said mixture for the basic composition being 0.1 to 4.0 parts by mole for manganese oxides in terms of $MnO_2$, 0.1 to 3.0 parts by mole for silicon dioxide, and 0.2 to 4.0 parts by mole for MgO, and then firing the resultant mixture.

In the above preferred embodiment, magnesium oxide can be replaced with the same amount of one oxide selected from the group consisting of calcium oxide, strontium oxide and barium oxide.

According to the present invention, there is also provided a method for producing non-reducible dielectric ceramics of the kind consisting essentially of a basic composition of a four component system $BaTiO_3$-$CaTiO_3$-$CaZrO_3$-$MgTiO_3$, and containing, as additives, manganese oxide, silicon dioxide and barium oxide, the method comprising the steps of separately preparing calcined powders of $BaTiO_3$, $CaTiO_3$, $CaZrO_3$ and $MgTiO_3$, mixing said calcined powders to prepare a mixture for a basic composition consisting essentially of 80.0 to 94.0 mole % of $BaTiO_3$, 4.0 to 14.0 mole % of $CaTiO_3$, 1.0 to 8.0 mole % of $CaZrO_3$ and 0.1 to 4.0 mole % of $MgTiO_3$, adding manganese oxide, silicon dioxide and barium oxide to said mixture for the basic composition, the respective added amount of said additives per 100 parts by mole of a mixture for a basic composition being 0.1 to 4.0 parts by mole for manganese oxides in terms of $MnO_2$, 0.1 to 3.0 parts by mole for silicon dioxide, and 0.2 to 4.0 parts by mole for calcium oxide, and firing the resultant mixture.

In the method of the present invention, the firing step is generally carried out in a reducing atmosphere to make it possible to use a base metal such as nickel as a material for internal electrodes of monolithic ceramic capacitors.

According to the present invention, there are provided the following non-reducible dielectric ceramics:

(1) A non-reducible dielectric ceramics consisting essentially of a basic composition and additives composed of manganese oxide and silicon dioxide, said basic composition consisting essentially of 82.0 to 93.0 mole % of $BaTiO_3$, 6.0 to 14.0 mole % of $CaTiO_3$ and 1.0 to 8.0 mole % of $CaZrO_3$, the contents of said additives per 100 parts by mole of the basic composition being 0.1 to 4.0 parts by mole for manganese oxides in terms of $MnO_2$, and 0.1 to 3.0 parts by mole for silicon dioxide. It is preferred that $BaTiO_3$ in the basic composition has a molar ratio of BaO to $TiO_2$ ranging from 1.002 to 1.05.

(2) A non-reducible dielectric ceramics consisting essentially of a basic composition and additives composed of manganese oxide, silicon dioxide and magnesium oxide, said basic composition consisting essentially of 82.0 to 93.0 mole % of $BaTiO_3$, 6.0 to 14.0 mole % of $CaTiO_3$ and 1.0 to 8.0 mole % of $CaZrO_3$, the contents of said additives per 100 parts by mole of the basic composition being 0.1 to 4.0 parts by mole for manganese oxides in terms of $MnO_2$, 0.1 to 3.0 parts by mole for silicon dioxide, and 0.2 to 4.0 parts by mole for MgO.

(3) A non-reducible dielectric ceramics consisting essentially of a basic composition and additives composed of manganese oxide, silicon dioxide and calcium oxide, said basic composition consisting essentially of 82.0 to 93.0 mole % of $BaTiO_3$, 6.0 to 14.0 mole % of $CaTiO_3$ and 1.0 to 8.0 mole % of $CaZrO_3$, the contents of said additives per 100 parts by mole of the basic composition being 0.1 to 4.0 parts by mole for manganese oxides in terms of $MnO_2$, 0.1 to 3.0 parts by mole for silicon dioxide, and 0.2 to 4.0 parts by mole for CaO.

(4) A non-reducible dielectric ceramics consisting essentially of a basic composition and additives composed of manganese oxide, silicon dioxide and strontium oxide, said basic composition consisting essentially of 82.0 to 93.0 mole % of $BaTiO_3$, 6.0 to 14.0 mole % of $CaTiO_3$ and 1.0 to 8.0 mole % of $CaZrO_3$, the contents of said additives per 100 parts by mole of the basic composition being 0.1 to 4.0 parts by mole for manganese oxides in terms of $MnO_2$, 0.1 to 3.0 parts by mole for silicon dioxide, and 0.2 to 4.0 parts by mole for SrO.

(5) A non-reducible dielectric ceramics consisting essentially of a basic composition and additives composed of manganese oxide, silicon dioxide and barium oxide, said basic composition consisting essentially of 82.0 to 93.0 mole % of $BaTiO_3$, 6.0 to 14.0 mole % of $CaTiO_3$ and 1.0 to 8.0 mole % of $CaZrO_3$, the contents of said additives per 100 parts by mole of the basic composition being 0.1 to 4.0 parts by mole for manganese oxides in terms of $MnO_2$, 0.1 to 3.0 parts by mole for silicon dioxide, and 0.2 to 4.0 parts by mole for BaO.

(6) a non-reducible dielectric ceramics consisting essentially of a basic composition and additives composed of manganese oxide, silicon dioxide and barium oxide, said basic composition consisting essentially of 80.0 to 94.0 mole % of $BaTiO_3$, 4.0 to 14.0 mole % of $CaTiO_3$, 1.0 to 8.0 mole % of $CaZrO_3$ and 0.1 to 4.0 mole % of $MgTiO_3$, the contents of said additives per 100 parts by mole of the basic composition being 0.1 to 4.0 parts by mole for manganese oxides in terms of $MnO_2$, 0.1 to 3.0 parts by mole for silicon dioxide, and 0.2 to 4.0 parts by mole for BaO.

These non-reducible dielectric ceramics possess high specific resistance of not less than $10^{12}$ $\Omega$cm even when fired in a reducing atmosphere at a temperature of 1270° to 1360° C, and have high dielectric constant of not less than 3000 and small temperature change rate of capacitance ranging from −15 to +15% at a wide temperature range of −55° C. to +125° C.

In the preferred embodiment of the present invention, there is provided a non-reducible dielectric ceramics having a low dielectric loss (tan δ) of not more than 1%, small temperature change rate of dielectric constant ranging from −10 to +10% at a temperature range of −25° C. to +85° C.

Accordingly, these non-reducible dielectric ceramics produced by the method of the present invention are useful as a dielectric material for ceramic capacitors with a large capacitance. In addition, the present invention makes it possible to produce inexpensive monolithic ceramic capacitors having excellent electrical properties, using a base metal such as nickel as a material for internal electrodes.

The reasons why the composition of the non-reducible dielectric ceramics of the three component system according to the present invention has been limited to those having the above ranges will be apparent from the following description.

Firstly, the content of $BaTiO_3$ in the basic composition has been limited to those ranging from 82 mol % of 93 mol % for the following reasons. If the content of $BaTiO_3$ is less than 82 mole %, the dielectric constant becomes small. If the content of $BaTiO_3$ exceeds 93 mol %, the temperature characteristics of the dielectric constant becomes worse.

In the system $BaTiO_3$-$CaTiO_3$-$ZaZrO_3$+manganese oxide+$SiO_2$, if the molar ratio of BaO to $TiO_2$ in $BaTiO_3$, i.e., $BaO/TiO_2$ is less than 1.002, the specific resistance is decreased by sintering in the reducing atmosphere, and the temperature change rate of dielectric constant becomes large. If the molar ratio of BaO to $TiO_2$ exceeds 1.05, the dielectric constant becomes lowered, and the sintering properties becomes worse.

If the content of $CaTiO_3$ in the basic composition is less than 6 mol %, the temperature change rate of dielectric constant becomes large and exceeds −15%. If the content of $CaTiO_3$ exceeds 14 mol %, the dielectric constant becomes small. A molar ratio of CaO to $TiO_2$ in the $CaTiO_3$ is equivalent.

If the content of $CaZrO_3$ in the basic composition is less than 1 mol %, the temperature change rate of dielectric constant exceeds −15%. If the content of $CaZrO_3$ exceeds 8 mol %, the dielectric constant becomes small. A molar ratio of CaO to $ZrO_2$ in the $CaZrO_3$ is equivalent.

For these reasons, the ratio of $BaO/TiO_2$ and the contents of $BaTiO_3$, $CaTiO_3$ and $CaZrO_3$ in the basic composition have been limited to those falling in the respective above ranges.

The contents of the additives have been limited to those in the respective above ranges for the following reasons. If the content of $MnO_2$ is less than 0.1 part by mole per 100 parts by mole of the basic composition, the dielectric constant becomes small and the temperature characteristics of the dielectric constant becomes worse. If the content of $MnO_2$ exceeds 4 parts by mole, the dielectric constant becomes small.

If the content of $SiO_2$ is less than 0.1 part by mole per 100 parts by mole of the basic composition, the sintering properties become worse and the temperature change rate of dielectric constant becomes large. If the content of $SiO_2$ exceeds 3 parts by mole, the dielectric constant becomes small and the temperature change rate of dielectric constant become large.

One of the oxides selected from the group consisting of magnesium oxide, calcium oxide, strontium oxide and barium oxide is additionally incorporated in the basic composition. If the content of such an oxide is less than 0.2 parts by mole per 100 part by mole of the basic composition, the temperature characteristics of dielectric constant exceeds 15%. If the content of such an oxide exceeds 4 parts by mole, the dielectric constant becomes small and the sintering properties become worse.

The composition of the non-reducible dielectric ceramics of the four component system according to the present invention has been limited to those having the above range for the following reasons.

If the content of $BaTiO_3$ in the basic composition is less than 80 mole %, the dielectric constant becomes small. If the content of $BaTiO_3$ exceeds 94 mol %, the temperature characteristics of the dielectric constant becomes worse.

If the content of $CaTiO_3$ in the basic composition is less than 4 mol %, the temperature change rate of dielectric constant exceeds −15%. If the content of $CaTiO_3$ exceeds 14 mol %, the dielectric constant becomes small.

If the content of $CaZrO_3$ in the basic composition is less than 1 mol %, the temperature change rate of dielectric constant exceeds −15%. If the content of $CaZrO_3$ exceeds 8 mol %, the dielectric constant becomes small.

If the content of $MgTiO_3$ in the basic composition is less than 0.1 mol %, the temperature characteristics of dielectric constant becomes worse. If the content of $MgTiO_3$ exceeds 4 mol %, the dielectric constant becomes small.

For these reasons, the contents of $BaTiO_3$, $CaTiO_3$, $CaZrO_3$ and $MgTiO_3$ in the basic composition have been limited to those falling within the respective above ranges.

If the content of $MnO_2$ is less than 0.1 part by mole per 100 parts by mole of the basic composition, the dielectric constant becomes small and the temperature characteristics of the dielectric constant becomes worse. If the content of $MnO_2$ exceeds 4 parts by mole, the dielectric constant becomes small.

If the content of $SiO_2$ is less than 0.1 part by mole per 100 parts by mole of the basic composition, the sintering properties become worse and the temperature change rate of dielectric constant becomes large. If the content of $SiO_2$ exceeds 3 parts by mole, the dielectric constant becomes small and the temperature change rate of the dielectric constant becomes large.

If the content of BaO is less than 0.2 part by mole per 100 parts by mole of the basic composition, the specific resistance is lowered when the ceramic composition is fired in the reducing atmosphere and the temperature change rate of dielectric constant becomes large. If the content of BaO exceeds 4 parts by mole results, the dielectric constant becomes small, the sintering properties become worse and the dielectric loss exceeds 1%.

EXAMPLE 1

Firstly, raw materials $BaCO_3$ and $TiO_2$ were weighed to prepare a mixture with a $BaCO_3/TiO_2$ ratio of 1.002 to 1.05, ball-milled to prepare a fully uniform or homogeneous mixture, calcined in air at 1200° C. for 1 hour. The calcined body was crushed and then milled to obtain calcined powder of $BaTiO_3$.

In the same manner, there were prepared calcined powders of $CaTiO_3$ and $CaZrO_3$ from a mixture of equivalent mole of $CaCO_3$, $TiO_2$ and a mixture of equivalent mole of $CaCO_3$ and $ZrO_2$, respectively.

X-ray diffraction patterns show that the thus obtained calcined powders have an uniform crystal structure.

These calcined powders of $BaTiO_3$, $CaTiO_3$ and $CaZrO_3$ were weighed and mixed with powders of $MnO_2$ and $SiO_2$ to prepare a mixture of which the final product has a composition shown in Table 1. The resultant mixture was milled by the wet process together with 5% by weight of vinyl acetate organic binder, dehydrated by evaporation, dried and then graded. The resultant powder was pressed into green ceramic discs with a diameter of 10 mm and a thickness of 1 mm under a pressure of 2000 $Kg/cm^2$.

The green discs were placed in an alumina sagger having its bottom covered with zirconia powder, heated to and maintained at 500° C. for 2 hours in air to burn the organic binder, and then fired at 1270° to 1360° C. for 2 hours in a reducing atmosphere consisting of hydrogen and nitrogen in which the volume ratio of $H_2$ to $N_2$ was 3/100.

Sintered discs were provided with In-Ga alloy electrodes on opposite sides to prepare test specimens.

COMPARATIVE EXAMPLE

The same powders of $BaCO_3$, $TiO_2$, $CaCO_3$, $ZrO_2$, $MnO_2$ and $SiO_2$ as those used in Example 1 were used as raw materials for preparation of a comparative specimen. These raw materials were weighed to prepare a mixture of which the final product has the composition shown in Table 1A. The mixture was milled by the wet process to prepare a fully uniform mixture, and calcined at 1150° C. for 2 hours in air. The calcined body was crushed, milled by the wet process together with 5% by weight of vinyl acetate organic binder, dehydrated by evaporation, dried and then graded. The resultant powder was pressed into discs with a diameter of 10 mm and a thickness of 1 mm under a pressure of 2000 $Kg/cm^2$.

The discs were placed in an alumina sagger having its bottom covered with zirconia powder, heated to and maintained at 500° C. for 2 hours in air to burn the organic binder, and then fired at 1270° to 1360° C. for 2 hours in a reducing atmosphere consisting of hydrogen and nitrogen in which the volume ratio of $H_2$ to $N_2$ was 3/100. Sintered discs were provided with In-Ga alloy electrodes on opposite sides to prepare test specimen.

The test specimens were subjected to measurement of electrical properties including dielectric constant, dielectric loss (tan δ), temperature change rate of dielectric constant and specific resistance.

The dielectric constant ($\epsilon$) and dielectric loss (tan δ) were measured at a frequency of 1 KHz and at 25° C. The temperature change rate of dielectric constant ($\Delta C/C_{25}$) the temperature range of −55° C. to 125° C. was determined by the following equation:

$$\Delta C/C_{25} = \frac{C_{25} - C_t}{C_{25}}$$

where $C_{25}$ is the capacitance at 25° C., $C_t$ is the capacitance at −55° C. or 125° C.

The temperature change rate of dielectric constant in the temperature range of −25 to +85° C., $\Delta C/C_{20}$, was determined from the values of capacitance measured at −25° C., +20° C., and +85° C. with the same equation mentioned above.

The specific resistance was determined by the measurement of a current flowing through the specimen after 2 minutes from the time at which a DC voltage of 500 volts at 25° C. was applied to the specimen.

Results are shown in Table 2 together with their sintering temperatures ($T_{sin}$) In the Table 2, the underlined values are undesired characteristics.

TABLE 1

| No. | Basic composition (mol %) | | | | Additives (mol/100 mol) | |
|---|---|---|---|---|---|---|
| | $BaO/TiO_2$ | $BaTiO_3$ | $CaTiO_3$ | $CaZrO_3$ | $MnO_2$ | $SiO_2$ |
| 1* | 1.000 | 88 | 8 | 4 | 1.0 | 2.0 |
| 2 | 1.002 | 88 | 8 | 4 | 1.0 | 2.0 |
| 3 | 1.05 | 88 | 8 | 4 | 1.0 | 2.0 |
| 4* | 1.1 | 88 | 8 | 4 | 1.0 | 2.0 |
| 5* | 1.02 | 92 | 3 | 5 | 1.0 | 2.0 |
| 6* | 1.02 | 89 | 10.5 | 0.5 | 1.0 | 2.0 |
| 7* | 1.02 | 82.5 | 16 | 1.5 | 1.0 | 2.0 |
| 8* | 1.02 | 81 | 12 | 7 | 1.0 | 2.0 |
| 9* | 1.02 | 83 | 7 | 10 | 1.0 | 2.0 |
| 10* | 1.02 | 96 | 2 | 2 | 1.0 | 2.0 |
| 11 | 1.02 | 93 | 6 | 1 | 1.0 | 2.0 |
| 12 | 1.02 | 85 | 14 | 1 | 1.0 | 2.0 |
| 13 | 1.02 | 82 | 14 | 4 | 1.0 | 2.0 |
| 14 | 1.02 | 82 | 10 | 8 | 1.0 | 2.0 |
| 15 | 1.005 | 88 | 8 | 4 | 2.0 | 2.0 |
| 16 | 1.02 | 90 | 8 | 2 | 1.0 | 2.0 |
| 17 | 1.02 | 88 | 8 | 4 | 1.0 | 2.0 |
| 18 | 1.01 | 88 | 8 | 4 | 1.0 | 2.0 |
| 19* | 1.02 | 88 | 8 | 4 | 0 | 2.0 |
| 20 | 1.02 | 88 | 8 | 4 | 0.1 | 2.0 |
| 21 | 1.02 | 88 | 8 | 4 | 4.0 | 2.0 |
| 22* | 1.02 | 88 | 8 | 4 | 8.0 | 2.0 |
| 23* | 1.02 | 88 | 8 | 4 | 1.0 | 0 |
| 24 | 1.02 | 88 | 8 | 4 | 1.0 | 0.1 |
| 25 | 1.02 | 88 | 8 | 4 | 1.0 | 3.0 |
| 26* | 1.02 | 88 | 8 | 4 | 1.0 | 5.0 |
| 27 | 1.02 | 88 | 7 | 5 | 1.0 | 2.0 |

TABLE 1A

| No. | Basic composition $\{(Ba_{1-x}Ca_x)O\}_m(Ti_{1-y}Zr_y)O_2$ | | | | Additives (mol/100 mol) | |
|---|---|---|---|---|---|---|
| | m | Ba 1−x | Ca x | Ti 1−y | Zr y | |
| | | | | | $MnO_2$ | $SiO_2$ |
| 28* | 1.02 | 0.91 | 0.09 | 0.95 | 0.05 | 1.0 | 2.0 |

TABLE 2

| No. | $T_{sin}$ (°C.) | $\epsilon$ | tan δ (%) | $\Delta C/C_{25}$ (%) −55° C. | $\Delta C/C_{25}$ (%) 125° C. | $\Delta C/C_{20}$ (%) −25°C. | $\Delta C/C_{20}$ (%) 85° C. | Specific resistance (Ωcm) |
|---|---|---|---|---|---|---|---|---|
| 1* | 1300 | 3368 | 0.97 | −41.6 | −3.0 | −29.7 | −4.7 | 7.4 × 10⁹ |
| 2 | 1270 | 3174 | 0.79 | −14.3 | −1.4 | −9.9 | −6.1 | 7.8 × 10¹² |
| 3 | 1300 | 3057 | 0.86 | −10.0 | −2.7 | −7.3 | −2.6 | 6.2 × 10¹² |
| 4* | 1360 | 1943 | 0.71 | +5.2 | −8.3 | +3.8 | −5.1 | 7.7 × 10¹² |
| 5* | 1360 | 3516 | 0.87 | −25.3 | +2.6 | −18.0 | −8.1 | 8.9 × 10¹² |
| 6* | 1330 | 3286 | 0.70 | −23.4 | +17.1 | −15.8 | −5.7 | 7.3 × 10¹² |
| 7* | 1300 | 2211 | 0.93 | −14.8 | +0.3 | −10.1 | +3.8 | 5.8 × 10¹² |
| 8* | 1330 | 2290 | 0.59 | −9.6 | −8.7 | −5.3 | −7.5 | 8.2 × 10¹² |
| 9* | 1270 | 1826 | 0.75 | −6.1 | −6.2 | −3.8 | −8.4 | 6.4 × 10¹² |
| 10* | 1270 | 3284 | 0.92 | −20.7 | +0.7 | −15.0 | −8.2 | 9.1 × 10¹² |
| 11 | 1360 | 3528 | 0.81 | −14.9 | +10.4 | −9.1 | +1.2 | 9.8 × 10¹² |

TABLE 2-continued

| No. | $T_{sin}$ (°C.) | $\epsilon$ | tan δ (%) | ΔC/C$_{25}$ (%) −55° C. | ΔC/C$_{25}$ (%) 125° C. | ΔC/C$_{20}$ (%) −25°C. | ΔC/C$_{20}$ (%) 85° C. | Specific resistance (Ωcm) |
|---|---|---|---|---|---|---|---|---|
| 12 | 1270 | 3042 | 0.72 | −14.1 | +2.5 | −9.8 | −9.1 | $1.1 \times 10^{13}$ |
| 13 | 1300 | 3089 | 0.88 | −10.7 | −4.1 | −5.3 | +0.1 | $9.1 \times 10^{12}$ |
| 14 | 1300 | 3158 | 0.63 | −3.2 | +6.2 | −2.5 | +6.0 | $8.6 \times 10^{12}$ |
| 15 | 1270 | 3170 | 0.90 | −12.4 | −1.7 | −7.7 | −6.1 | $7.3 \times 10^{12}$ |
| 16 | 1300 | 3049 | 0.66 | −14.5 | +8.7 | −9.6 | −2.4 | $5.8 \times 10^{12}$ |
| 17 | 1330 | 3065 | 0.91 | −9.2 | +3.5 | −5.4 | −6.7 | $7.6 \times 10^{12}$ |
| 18 | 1360 | 3407 | 0.78 | −9.5 | +1.2 | −4.8 | −5.2 | $8.0 \times 10^{12}$ |
| 19* | 1300 | 2720 | 0.75 | −38.0 | −5.3 | −26.9 | −2.6 | $1.0 \times 10^{13}$ |
| 20 | 1330 | 3010 | 0.84 | −13.3 | +0.2 | −8.1 | −5.1 | $9.7 \times 10^{12}$ |
| 12 | 1270 | 3082 | 0.92 | −14.6 | −1.7 | −9.6 | +4.2 | $9.1 \times 10^{12}$ |
| 22* | 1300 | 1997 | 0.58 | −6.5 | +3.8 | −3.7 | −5.0 | $5.9 \times 10^{12}$ |
| 23* | 1360 | 2943 | 0.73 | −27.3 | +0.2 | −17.4 | −2.9 | $8.3 \times 10^{12}$ |
| 24 | 1300 | 3146 | 0.89 | −13.9 | −5.3 | −9.1 | −7.2 | $9.5 \times 10^{12}$ |
| 25 | 1270 | 3089 | 0.54 | +5.6 | −8.7 | +3.5 | −8.8 | $7.3 \times 10^{12}$ |
| 26* | 1360 | 1812 | 0.74 | +15.7 | −18.3 | −10.7 | −17.6 | $5.1 \times 10^{12}$ |
| 27 | 1270 | 3245 | 0.63 | −11.4 | −2.6 | −6.5 | −4.7 | $8.6 \times 10^{12}$ |
| 28* | 1250 | 1369 | 2.30 | −50.1 | −21.7 | −18.7 | +215.8 | $2.2 \times 10^{12}$ |

As can be seen from the results shown in Table 2, the present invention makes it possible to produce dielectric ceramics having dielectric constant of not less than 3000, dielectric loss of not more than 1.00%, the temperature change rate of capacitance ranging from −15 to +15% in a temperature range of from −55° to +125° C., and the temperature change rate of dielectric constant ranging from −10 to +10% in a temperature range of −25° to +85 ° C., and specific resistance of not less than $10^{12}$.

From the comparison of the results for specimen No. 27 with those for specimen No. 28, it can be seen that the dielectric ceramics produced by the present invention is superior in dielectric properties such as dielectric constant and temperature change rate of dielectric constant, as compared to that produced by the method of the prior art.

In the above example, the sintering is carried out in a reducing atmosphere consisting of hydrogen and nitrogen, but it is possible to use a non-oxidizing atmosphere comprising non-oxidizing gas selected from the group consisting of Ar, CO, $CO_2$, $H_2$, $N_2$ and a mixture thereof.

EXAMPLE 2

Raw materials $BaCO_3$ and $TiO_2$ were weighed to prepare a mixture, ball-milled to prepare a fully uniform or homogeneous mixture, calcined in air at 1200° C. for 1 hour. The calcined body was crushed and then milled to obtain calcined powder of $BaTiO_3$.

In the same manner, there were prepared calcined powders of $CaTiO_3$ and $CaZrO_3$, using a mixture of $CaCO_3$ and $TiO_2$ and a mixture of $CaCO_3$ and $ZrO_2$, respectively.

X-ray diffraction patterns for each calcined powder show that they have an uniform crystal structure, respectively.

These calcined powders of $BaTiO_3$, $CaTiO_3$ and $CaZrO_3$ were weighed and mixed with powders of $MnO_2$, MgO and $SiO_2$ to prepare a mixture of which the final product has a composition shown in Table 3A. The resultant mixture was milled by the wet process together with 5% by weight of an organic binder of vinyl acetate, dehydrated by evaporation and dried to prepare granulated powders. After grading, the resultant powder was compacted to discs with a diameter of 10 mm and a thickness of 1 mm under a pressure of 2000 Kg/cm².

The discs were placed in an alumina sagger having its bottom covered with zirconia powder, and then fired at 1270° to 1360° C. for 2 hours in a reducing atmosphere consisting of hydrogen and nitrogen with a volume ratio of $H_2$ to $N_2$ of 3/100.

Sintered discs were provided with In-Ga alloy electrodes on opposite sides to prepare test specimens.

COMPARATIVE EXAMPLE 2

The same powders of $BaCO_3$, $TiO_2$, $CaCO_3$, $ZrO_2$, $MnO_2$, MgO and $SiO_2$ as those used in Example 2 were used as raw materials for preparation of a comparative specimen. These raw materials were weighed to prepare a mixture of which the final product has the composition shown in Table 3B. The mixture was milled by the wet process to prepare a fully uniform mixture, and calcined at 1150° C. for 2 hours in air. The calcined body was crushed, milled by the wet process together with 5% by weight of an organic binder of vinyl acetate, dehydrated by evaporation, dried and then graded. The resultant powder was compacted to discs with a diameter of 10 mm and a thickness of 1 mm under a pressure of 2000 Kg/cm².

The discs were placed in an alumina sagger having its bottom covered with zirconia powder, heated to and maintained at 500° C. for 2 hours in air to burn the organic binder, and then fired at 1270° to 1360° C. for 2 hours in a reducing atmosphere consisting of hydrogen and nitrogen in which the volume ratio of $H_2$ to $N_2$ was 3/100. Sintered discs were provided with In-Ga alloy electrodes on opposite sides to prepare comparative test specimens.

The electrical properties of these test specimens were measured in the same manner as in Example 1. Results obtained are shown in Table 4 together with their sintering temperatures ($T_{sin}$) In tables 3A, 3B and 4, the asterisked specimens are those beyond the scope of the present invention.

TABLE 3A

| No. | Basic composition (mol %) BaTiO$_3$ | Basic composition (mol %) CaTiO$_3$ | Basic composition (mol %) CaZrO$_3$ | Additives (mol/100 mol) MnO$_2$ | Additives (mol/100 mol) MgO | Additives (mol/100 mol) SiO$_2$ |
|---|---|---|---|---|---|---|
| 29* | 92 | 3 | 5 | 1.0 | 2.0 | 2.0 |
| 30* | 89 | 10.5 | 0.5 | 1.0 | 2.0 | 2.0 |
| 31* | 82.5 | 16 | 1.5 | 1.0 | 2.0 | 2.0 |
| 32* | 81 | 12 | 7 | 1.0 | 2.0 | 2.0 |
| 33* | 83 | 7 | 10 | 1.0 | 2.0 | 2.0 |
| 34* | 96 | 2 | 2 | 1.0 | 2.0 | 2.0 |

TABLE 3A-continued

| No. | Basic composition (mol %) | | | Additives (mol/100 mol) | | |
|---|---|---|---|---|---|---|
| | $BaTiO_3$ | $CaTiO_3$ | $CaZrO_3$ | $MnO_2$ | MgO | $SiO_2$ |
| 35 | 93 | 6 | 1 | 1.0 | 2.0 | 2.0 |
| 36 | 85 | 14 | 1 | 1.0 | 2.0 | 2.0 |
| 37 | 82 | 14 | 4 | 1.0 | 2.0 | 2.0 |
| 38 | 82 | 10 | 8 | 1.0 | 2.0 | 2.0 |
| 39 | 88 | 8 | 4 | 2.0 | 0.5 | 2.0 |
| 40 | 90 | 8 | 2 | 1.0 | 2.0 | 2.0 |
| 41 | 88 | 8 | 4 | 1.0 | 2.0 | 2.0 |
| 42 | 88 | 8 | 4 | 2.0 | 1.0 | 2.0 |
| 43* | 88 | 8 | 4 | 0 | 2.0 | 2.0 |
| 44 | 88 | 8 | 4 | 0.1 | 2.0 | 2.0 |
| 45 | 88 | 8 | 4 | 4.0 | 2.0 | 2.0 |
| 46* | 88 | 8 | 4 | 8.0 | 2.0 | 2.0 |
| 47* | 88 | 8 | 4 | 1.0 | 0 | 2.0 |
| 48 | 88 | 8 | 4 | 1.0 | 0.2 | 2.0 |
| 49 | 88 | 8 | 4 | 1.0 | 4.0 | 2.0 |
| 50* | 88 | 8 | 4 | 1.0 | 8.0 | 2.0 |
| 51* | 88 | 8 | 4 | 1.0 | 2.0 | 0 |
| 52 | 88 | 8 | 4 | 1.0 | 2.0 | 0.1 |
| 53 | 88 | 8 | 4 | 1.0 | 2.0 | 3.0 |
| 54* | 88 | 8 | 4 | 1.0 | 2.0 | 5.0 |
| 55 | 88 | 8 | 4 | 1.0 | 3.0 | 1.5 |

TABLE 3B

| No. | $\{(Ba_{1-x-y}Ca_x Mg_y)O\}_m (Ti_{1-z}Zr_z)O_2$ | | | | | Additives (mol/100 mol) | |
|---|---|---|---|---|---|---|---|
| | m | Ba $1-x-y$ | Ca x | Mg y | Ti $1-z$ | Zr z | $MnO_2$ | $SiO_2$ |
| 56* | 1.02 | 0.86 | 0.11 | 0.03 | 0.96 | 0.04 | 1.0 | 1.5 |

TABLE 4

| No. | $T_{sin}$ (°C.) | Dielectric constant, $\epsilon$ | tan δ (%) | $\Delta C/C_{25}$ (%) | | $\Delta C/C°$ (%) | | Specific resistance (Ωcm) |
|---|---|---|---|---|---|---|---|---|
| | | | | -55° C. | +125° C. | -25° C. | 85° C. | |
| 29* | 1,270 | 3,582 | 0.64 | -25.2 | +0.3 | -20.1 | -6.7 | $6.4 \times 10^{12}$ |
| 30* | 1,330 | 3,447 | 0.85 | -23.8 | +10.4 | -18.2 | -5.4 | $7.3 \times 10^{12}$ |
| 31* | 1,300 | 2,256 | 0.84 | -12.5 | +4.3 | -8.4 | +0.4 | $9.7 \times 10^{12}$ |
| 32* | 1,300 | 2,726 | 0.84 | -13.0 | -3.7 | -92. | -6.2 | $1.3 \times 10^{13}$ |
| 33* | 1,270 | 2,509 | 0.66 | -11.5 | -5.1 | -6.8 | -9.0 | $9.4 \times 10^{12}$ |
| 34* | 1,330 | 3,286 | 0.14 | -27.6 | +1.2 | -22.6 | -0.3 | $9.5 \times 10^{12}$ |
| 35 | 1,330 | 3,511 | 0.93 | -14.5 | +10.2 | -9.6 | +5.7 | $7.4 \times 10^{12}$ |
| 36 | 1,360 | 3,216 | 0.90 | -14.8 | +3.4 | -9.5 | -7.3 | $8.7 \times 10^{12}$ |
| 37 | 1,330 | 3,054 | 0.69 | -10.2 | +4.8 | -7.3 | -0.9 | $6.1 \times 10^{12}$ |
| 38 | 1,270 | 3,083 | 0.61 | -10.6 | +8.4 | -3.7 | +6.4 | $8.6 \times 10^{12}$ |
| 39 | 1,300 | 3,371 | 0.85 | -14.6 | +4.0 | -8.3 | -8.1 | $8.7 \times 10^{12}$ |
| 40 | 1,330 | 3,444 | 0.78 | -13.5 | +7.5 | -7.2 | +3.3 | $9.3 \times 10^{12}$ |
| 41 | 1,360 | 3,187 | 0.92 | -13.8 | +3.9 | -9.4 | -4.7 | $1.2 \times 10^{13}$ |
| 42 | 1,270 | 3,080 | 0.68 | -7.6 | +0.7 | -4.1 | -7.3 | $8.2 \times 10^{12}$ |
| 43* | 1,330 | 3,176 | 0.96 | -35.8 | +3.3 | -28.6 | -3.0 | $6.0 \times 10^{12}$ |
| 44 | 1,300 | 3,246 | 0.75 | -14.7 | +3.6 | -9.3 | -3.1 | $7.5 \times 10^{12}$ |
| 45 | 1,330 | 3,008 | 0.71 | -11.2 | +2.2 | -8.4 | -3.9 | $8.1 \times 10^{12}$ |
| 46* | 1,270 | 1,983 | 0.88 | -10.5 | +1.4 | -7.8 | -3.5 | $7.1 \times 10^{12}$ |
| 47* | 1,330 | 3,572 | 1.14 | -35.8 | -5.1 | -24.3 | -2.7 | $8.6 \times 10^{9}$ |
| 48 | 1,270 | 3,292 | 0.82 | -14.5 | -4.3 | -9.6 | -8.3 | $6.3 \times 10^{12}$ |
| 49 | 1,330 | 3,025 | 0.68 | -3.2 | -7.2 | -2.7 | -6.4 | $7.9 \times 10^{12}$ |
| 50* | 1,400 | 1,796 | 0.79 | +4.1 | -7.8 | +3.0 | -4.2 | $6.3 \times 10^{12}$ |
| 51* | 1,360 | 2,413 | 0.97 | -24.9 | -6.3 | -19.8 | -8.3 | $9.9 \times 10^{12}$ |
| 52 | 1,330 | 3,087 | 0.73 | -13.8 | -7.4 | -9.7 | -8.1 | $8.5 \times 10^{12}$ |
| 53 | 1,300 | 3,106 | 0.81 | -2.1 | -9.8 | -1.1 | -8.3 | $6.9 \times 10^{12}$ |
| 54* | 1,270 | 2,374 | 0.65 | +19.4 | -15.8 | +14.1 | -12.4 | $6.4 \times 10^{12}$ |
| 55 | 1,300 | 3,472 | 0.85 | -11.4 | +2.6 | -7.2 | -5.1 | $8.3 \times 10^{12}$ |
| 56* | 1,290 | 7,241 | 0.97 | -59.7 | -65.7 | -27.6 | -34.2 | $1.3 \times 10^{12}$ |

As can be seen from the results shown in Table 4, the present invention makes it possible to produce dielectric ceramics of a system $BaTiO_3$-$CaTiO_3$-$CaZrO_3$+$MnO_2$+BaO+$SiO_2$ having dielectric constant of not less than 3000, dielectric loss of not more than 1.00%, the temperature change rate of capacitance ranging from -15 to +15% in a temperature range of from -55° to +125° C., and the temperature change rate of dielectric constant ranging from -10 to +10 % in a temperature range of -25° to +85 ° C.

From the comparison of the results for specimen No. 55 with those for specimen No. 56, it can be seen that the dielectric ceramics produced by the present invention has a small temperature change rate of dielectric constant, while that produced by the method of the prior art is low in dielectric constant and large in temperature change rate of dielectric constant.

EXAMPLE 3

$BaCO_3$ and $TiO_2$ were weighed to prepare a mixture for preparation of $BaTiO_3$, ball-milled to prepare a fully uniform or homogeneous mixture, calcined in air at 1200° C. for 1 hour. The calcined body was crushed and then milled to obtain calcined powder of $BaTiO_3$.

In the same manner, there were prepared calcined powders of $CaTiO_3$ and $CaZrO_3$, using a mixture of $CaCO_3$ and $TiO_2$ and a mixture of $CaCO_3$ and $ZrO_2$, respectively.

X-ray diffraction patterns for these calcined powders show that they have an uniform crystal structure.

The calcined powders of $BaTiO_3$, $CaTiO_3$ and $CaZrO_3$ were weighed together with powders of $MnO_2$, CaO and $SiO_2$ to prepare a mixture of which the final product has a composition shown in Table 5A. In this table, the underlined values are those beyond the scope of the present invention. The resultant mixture was milled by the wet process together with 5% by weight of an organic binder of vinyl acetate, dehydrated by evaporation, dried and then graded. The resultant powder was compacted to discs with a diameter of 10 mm and a thickness of 1 mm under a pressure of 2000 Kg/cm$^2$.

The discs were placed in an alumina sagger having its bottom covered with zirconia powder, and then fired at 1270 to 1360° C. for 2 hours in a reducing atmosphere consisting of hydrogen and nitrogen with a volume ratio of $H_2$ to $N_2$ of 3/100.

Sintered discs were provided with In-Ga alloy electrodes on opposite sides to prepare test specimens.

COMPARATIVE EXAMPLE 3

The same powders of $BaCO_3$, $TiO_2$, $CaCO_3$, $ZrO_2$, $MnO_2$, CaO and $SiO_2$ as those used in Example 3 were used as raw materials for preparation of a comparative specimen. These raw materials were weighed to prepare a mixture of which the final product has the composition shown in Table 5B. The mixture was milled by the wet process to prepare a fully uniform mixture, and calcined at 1150° C. for 2 hours in air. The calcined body was crushed, milled by the wet process together with 5% by weight of an organic binder of vinyl acetate, dehydrated by evaporation, dried and then graded. The resultant powder was compacted to discs with a diameter of 10 mm and a thickness of 1 mm under a pressure of 2000 $Kg/cm^2$.

The discs were placed in an alumina sagger having its bottom covered with zirconia powder, heated to and maintained at 500° C. for 2 hours in air to burn the organic binder, and then fired at 1270° to 1360° C. for 2 hours in a reducing atmosphere consisting of hydrogen and nitrogen in which the volume ratio of $H_2$ to $N_2$ was 3/100. Sintered discs were provided with In-Ga alloy electrodes on opposite sides to prepare comparative test specimens.

The electrical properties of these test specimens were measured in the same manner as in Example 1. Results obtained are shown in Table 6 together with their sintering temperatures ($T_{sin}$). In tables 5A, 5B and 6, the asterisked specimens are those beyond the scope of the present invention.

TABLE 5A

| No. | Basic composition (mol %) | | | Additives (mol/100 mol) | | |
|---|---|---|---|---|---|---|
| | $BaTiO_3$ | $CaTiO_3$ | $CaZrO_3$ | $MnO_2$ | CaO | $SiO_2$ |
| 57* | 92 | 3 | 5 | 1.0 | 2.0 | 2.0 |
| 58* | 89 | 10.5 | 0.5 | 1.0 | 2.0 | 2.0 |
| 59* | 82.5 | 16 | 1.5 | 1.0 | 2.0 | 2.0 |
| 60* | 81 | 12 | 7 | 1.0 | 2.0 | 2.0 |
| 61* | 83 | 7 | 10 | 1.0 | 2.0 | 2.0 |
| 62* | 96 | 2 | 2 | 1.0 | 2.0 | 2.0 |
| 63 | 93 | 6 | 1 | 1.0 | 2.0 | 2.0 |
| 64 | 85 | 14 | 1 | 1.0 | 2.0 | 2.0 |
| 65 | 82 | 14 | 4 | 1.0 | 2.0 | 2.0 |
| 66 | 82 | 10 | 8 | 1.0 | 2.0 | 2.0 |
| 67 | 88 | 8 | 4 | 2.0 | 0.5 | 2.0 |
| 68 | 90 | 8 | 2 | 1.0 | 2.0 | 2.0 |
| 69 | 88 | 8 | 4 | 1.0 | 2.0 | 2.0 |
| 70 | 88 | 8 | 4 | 2.0 | 1.0 | 2.0 |
| 71* | 88 | 8 | 4 | 0 | 2.0 | 2.0 |
| 72 | 88 | 8 | 4 | 0.1 | 2.0 | 2.0 |
| 73 | 88 | 8 | 4 | 4.0 | 2.0 | 2.0 |
| 74* | 88 | 8 | 4 | 8.0 | 2.0 | 2.0 |
| 75* | 88 | 8 | 4 | 1.0 | 0 | 2.0 |
| 76 | 88 | 8 | 4 | 1.0 | 0.2 | 2.0 |
| 77 | 88 | 8 | 4 | 1.0 | 4.0 | 2.0 |
| 78* | 88 | 8 | 4 | 1.0 | 8.0 | 2.0 |
| 79* | 88 | 8 | 4 | 1.0 | 2.0 | 0 |
| 80 | 88 | 8 | 4 | 1.0 | 2.0 | 0.1 |
| 81 | 88 | 8 | 4 | 1.0 | 2.0 | 3.0 |
| 82* | 88 | 8 | 4 | 1.0 | 2.0 | 5.0 |
| 83 | 88 | 7 | 5 | 1.0 | 1.0 | 2.0 |

TABLE 5B

| No. | $\{(Ba_{1-x}Ca_x)O\}_m(Ti_{1-y}Zr_y)O_2$ | | | | | Additives (mol/100 mol) | |
|---|---|---|---|---|---|---|---|
| | m | Ba $1-x$ | Ca $x$ | Ti $1-y$ | Zr $y$ | $MnO_2$ | $SiO_2$ |
| 84* | 1.02 | 0.91 | 0.09 | 0.95 | 0.05 | 1.0 | 2.0 |

TABLE 6

| No. | $T_{sin}$ (°C.) | Dielectric constant, $\epsilon$ | tan δ (%) | $\Delta C/C_{25}$ (%) −55° C. | $\Delta C/C_{25}$ (%) +125° C. | $\Delta C/C°$(%) −25° C. | $\Delta C/C°$(%) 85° C. | Specific resistance (Ωcm) |
|---|---|---|---|---|---|---|---|---|
| 57* | 1300 | 3481 | 1.08 | −23.3 | +4.5 | −16.7 | −6.3 | 7.4 × $10^{12}$ |
| 58* | 1360 | 3295 | 1.04 | −20.2 | +14.9 | −14.0 | −3.9 | 7.6 × $10^{12}$ |
| 59* | 1330 | 2387 | 0.97 | −12.3 | +6.4 | −8.5 | +2.7 | 8.3 × $10^{12}$ |
| 60* | 1270 | 2163 | 0.71 | −8.4 | −7.7 | −5.8 | −7.6 | 7.9 × $10^{12}$ |
| 61* | 1270 | 1998 | 0.78 | −8.1 | −4.0 | −5.8 | −2.5 | 7.2 × $10^{12}$ |
| 62* | 1360 | 3255 | 0.74 | −27.8 | −3.7 | −19.3 | −3.8 | 8.2 × $10^{12}$ |
| 63 | 1300 | 3491 | 0.93 | −13.7 | +10.4 | −7.4 | −3.5 | 9.1 × $10^{12}$ |
| 64 | 1330 | 3106 | 0.63 | −14.4 | +4.2 | −9.2 | −3.8 | 8.0 × $10^{12}$ |
| 65 | 1330 | 3087 | 0.80 | −10.1 | −5.2 | −5.7 | −2.1 | 7.9 × $10^{12}$ |
| 66 | 1270 | 3016 | 0.88 | −10.0 | +3.8 | −5.8 | +9.4 | 7.7 × $10^{12}$ |
| 67 | 1360 | 3214 | 0.98 | −13.9 | +1.5 | −8.1 | +0.9 | 8.1 × $10^{12}$ |
| 68 | 1300 | 3332 | 0.82 | −13.1 | +9.9 | −7.3 | +9.4 | 1.0 × $10^{13}$ |
| 69 | 1330 | 3321 | 0.80 | −5.9 | +2.4 | −4.7 | −9.0 | 9.8 × $10^{12}$ |
| 70 | 1270 | 3493 | 0.98 | −14.2 | −3.2 | −9.3 | −5.4 | 9.2 × $10^{12}$ |
| 71* | 1360 | 3061 | 0.85 | −28.4 | −5.4 | −21.5 | −3.7 | 1.1 × $10^{13}$ |
| 72 | 1270 | 3282 | 0.74 | −14.7 | −5.1 | −9.6 | −3.8 | 9.8 × $10^{12}$ |
| 73 | 1330 | 3042 | 0.77 | −12.4 | −3.6 | −7.9 | −4.2 | 9.6 × $10^{12}$ |
| 74* | 1300 | 2169 | 0.81 | −6.0 | +3.2 | −3.4 | −6.2 | 8.1 × $10^{12}$ |
| 75* | 1330 | 3588 | 0.89 | −30.3 | −8.0 | −21.3 | −3.6 | 6.8 × $10^9$ |
| 76 | 1300 | 3347 | 0.73 | −14.1 | −5.3 | −9.2 | −3.4 | 6.2 × $10^{12}$ |
| 77 | 1270 | 3027 | 0.78 | −8.9 | −2.7 | −3.4 | −3.8 | 7.1 × $10^{12}$ |
| 78* | 1360 | 1867 | 0.92 | +9.5 | +0.4 | +6.8 | −4.2 | 6.8 × $10^9$ |
| 79* | 1360 | 2958 | 0.64 | −26.1 | −3.1 | −18.6 | −3.2 | 9.2 × $10^{12}$ |
| 80 | 1300 | 3072 | 0.89 | −14.3 | −4.7 | −9.7 | −3.3 | 7.9 × $10^{12}$ |
| 81 | 1300 | 3057 | 0.83 | +10.2 | −7.6 | +4.9 | −5.6 | 8.1 × $10^{12}$ |
| 82* | 1330 | 2096 | 0.72 | +19.3 | −8.7 | +10.6 | −13.7 | 8.4 × $10^{12}$ |
| 83 | 1330 | 3284 | 0.91 | −12.6 | −2.1 | −8.1 | −2.2 | 9.3 × $10^{12}$ |
| 84 | 1250 | 1369 | 2.30 | −50.1 | +21.7 | −18.7 | +215.8 | 2.2 × $10^{12}$ |

As can be seen from the results shown in Table 6, the present invention makes it possible to produce dielectric ceramics of a system $BaTiO_3$-$CaTiO_3$-$CaZrO_3$+$MnO_2$+CaO+$SiO_2$ having dielectric constant of not less than 3000, dielectric loss of not more than 1.00%, the temperature change rate of capacitance ranging from −15 to +15% in a temperature range of from −55° to +125° C., and the temperature change rate of dielectric constant ranging from −10 to +10 % in a temperature range of −25° to +85 ° C.

From the comparison of the results for specimen No. 83 with those for specimen No. 84, it can be seen that the dielectric ceramics produced by the present invention has a small temperature change rate of dielectric constant, while that produced by the method of the prior art is low in dielectric constant and large in temperature change rate of dielectric constant.

EXAMPLE 4

BaCO₃ and TiO₂ were weighed to prepare a mixture for preparation of BaTiO₃, ball-milled to prepare a fully uniform or homogeneous mixture, calcined in air at 1200° C. for 1 hour. The calcined body was crushed and then milled to obtain calcined powder of $BaTiO_3$.

In the same manner, there were prepared calcined powders of $CaTiO_3$ and $CaZrO_3$, using a mixture of $CaCO_3$ and $TiO_2$ and a mixture of $CaCO_3$ and $ZrO_2$, respectively. X-ray diffraction patterns for these calcined powders show that they have an uniform crystal structure.

The calcined powders of $BaTiO_3$, $CaTiO_3$ and $CaZrO_3$ were weighed together with powders of $MnO_2$, SrO and $SiO_2$ to prepare a mixture of which the final product has a composition shown in Table 7A. In this table, the underlined values are those beyond the scope of the present invention.

Using the resultant mixture, there were prepared test specimens in the same manner as in Example 3 under the same conditions.

COMPARATIVE EXAMPLE 4

Using the same powders of $BaCO_3$, $TiO_2$, $CaCO_3$, $ZrO_2$, $MnO_2$, SrO and $SiO_2$ as those used in Example 4, there was prepared a comparative specimen having the composition shown in Table 7B in the same manner as in comparative example 3 under the same conditions.

The electrical properties of the test specimens of Example 4 and comparative Example 4 were measured in the same manner as in Example 1. Results obtained are shown in Table 8 together with their sintering temperatures ($T_{sin}$) In tables 7A, 7B and 8, the asterisked specimens are those beyond the scope of the present invention.

TABLE 7A

| No. | Basic composition (mol %) | | | Additives (mol/100 mol) | | |
|---|---|---|---|---|---|---|
| | BaTiO₃ | CaTiO₃ | CaZrO₃ | MnO₂ | SrO | SiO₂ |
| 85* | 92 | 3 | 5 | 1.0 | 2.0 | 2.0 |
| 86* | 89 | 10.5 | 0.5 | 1.0 | 2.0 | 2.0 |
| 87* | 82.5 | 16 | 1.5 | 1.0 | 2.0 | 2.0 |
| 88* | 81 | 12 | 7 | 1.0 | 2.0 | 2.0 |
| 89* | 83 | 7 | 10 | 1.0 | 2.0 | 2.0 |
| 90* | 96 | 2 | 2 | 1.0 | 2.0 | 2.0 |
| 91 | 93 | 6 | 1 | 1.0 | 2.0 | 2.0 |
| 92 | 85 | 14 | 1 | 1.0 | 2.0 | 2.0 |
| 93 | 82 | 14 | 4 | 1.0 | 2.0 | 2.0 |
| 94 | 82 | 10 | 8 | 1.0 | 2.0 | 2.0 |
| 95 | 88 | 8 | 4 | 2.0 | 0.5 | 2.0 |
| 96 | 90 | 8 | 2 | 1.0 | 2.0 | 2.0 |
| 97 | 88 | 8 | 4 | 1.0 | 2.0 | 2.0 |
| 98 | 88 | 8 | 4 | 2.0 | 1.0 | 2.0 |
| 99* | 88 | 8 | 4 | 0 | 2.0 | 2.0 |
| 100 | 88 | 8 | 4 | 0.1 | 2.0 | 2.0 |
| 101 | 88 | 8 | 4 | 4.0 | 2.0 | 2.0 |
| 102* | 88 | 8 | 4 | 8.0 | 2.0 | 2.0 |
| 103* | 88 | 8 | 4 | 1.0 | 0 | 2.0 |
| 104 | 88 | 8 | 4 | 1.0 | 0.2 | 2.0 |
| 105 | 88 | 8 | 4 | 1.0 | 4.0 | 2.0 |
| 106* | 88 | 8 | 4 | 1.0 | 8.0 | 2.0 |
| 107* | 88 | 8 | 4 | 1.0 | 2.0 | 0 |
| 108 | 88 | 8 | 4 | 1.0 | 2.0 | 0.1 |
| 109 | 88 | 8 | 4 | 1.0 | 2.0 | 3.0 |
| 110* | 88 | 8 | 4 | 1.0 | 2.0 | 5.0 |
| 111 | 88 | 7 | 5 | 1.0 | 3.0 | 2.0 |

TABLE 7B

| No. | {(Ba₁₋ₓ₋ᵧCaₓSrᵧ)O}ₘ(Ti₁₋zZrz)O₂ | | | | | | Additives (mol/100 mol) | |
|---|---|---|---|---|---|---|---|---|
| | m | Ba 1−x−y | Ca x | Sr y | Ti 1−z | Zr z | MnO₂ | SiO₂ |
| 112* | 1.01 | 0.81 | 0.05 | 0.15 | 0.88 | 0.12 | 1.0 | 2.0 |

TABLE 8

| No. | $T_{sin}$ (°C.) | Dielectric constant, ε | tan δ (%) | ΔC/C₂₅ (%) | | ΔC/C° (%) | | Specific resistance (Ωcm) |
|---|---|---|---|---|---|---|---|---|
| | | | | −55° C. | +125° C. | −25° C. | 85° C. | |
| 85* | 1300 | 3135 | 0.84 | −26.2 | +1.8 | −17.3 | −10.1 | 7.3 × 10¹² |
| 86* | 1300 | 3269 | 0.87 | −22.4 | +9.3 | −15.8 | −8.2 | 7.7 × 10¹² |
| 87* | 1330 | 2533 | 0.72 | −13.0 | +5.4 | −7.3 | +0.4 | 8.0 × 10¹² |
| 88* | 1300 | 2137 | 0.59 | −14.8 | −2.4 | −10.1 | −7.9 | 3.9 × 10¹² |
| 89* | 1270 | 1924 | 0.56 | −8.0 | +3.2 | −4.4 | −7.3 | 6.8 × 10¹² |
| 90* | 1330 | 3476 | 0.83 | −23.9 | +2.2 | −16.1 | +1.4 | 9.7 × 10¹² |
| 91 | 1300 | 3305 | 0.87 | −13.7 | +11.3 | −9.6 | +4.7 | 7.8 × 10¹² |
| 92 | 1360 | 3091 | 0.91 | 31 14.8 | −2.7 | −7.2 | −7.8 | 8.2 × 10¹² |
| 93 | 1360 | 3050 | 0.97 | −9.3 | −3.3 | −5.0 | −4.5 | 9.6 × 10¹² |
| 94 | 1300 | 3008 | 0.84 | −10.6 | +3.5 | −5.4 | +5.2 | 6.9 × 10¹² |
| 95 | 1300 | 3324 | 0.87 | −11.9 | +4.2 | −7.5 | −6.5 | 8.3 × 10¹² |
| 96 | 1270 | 3261 | 0.74 | −10.5 | +8.8 | −7.3 | +3.7 | 7.2 × 10¹² |
| 97 | 1270 | 3100 | 0.83 | −7.1 | +1.3 | −4.8 | −8.2 | 8.2 × 10¹² |
| 98 | 1360 | 3415 | 0.92 | −10.5 | −3.2 | −7.3 | −4.1 | 9.5 × 10¹² |
| 99* | 1270 | 2699 | 0.62 | −24.8 | −8.1 | −17.7 | −5.0 | 7.4 × 10¹² |

As can be seen from the results shown in Table 8, the present invention makes it possible to produce dielectric ceramics of a system $BaTiO_3$-$CaTiO_3$-$CaZrO_3$+$MnO_2$+SrO+$SiO_2$ having dielectric constant of not less than 3000, dielectric loss of not more than 1.00%, the temperature change rate of capacitance ranging from −15 to +15% in a temperature range of from −55° to +125° C., and the temperature change rate of dielectric constant ranging from −10 to +10 in a temperature range of −25° to +85 ° C.

From the comparison of the results for specimen No. 111 with those for specimen No. 112, it can be seen that the dielectric ceramics produced by the present invention has a small temperature change rate of dielectric constant, while that produced by the method of the prior art is low in dielectric constant and large in temperature change rate of dielectric constant.

EXAMPLE 5

$BaCO_3$ and $TiO_2$ were weighed to prepare a mixture for preparation of $BaTiO_3$, ball-milled to prepare a fully uniform or homogeneous mixture, calcined in air at 1200° C. for 1 hour. The calcined body was crushed and then milled to obtain calcined powder of $BaTiO_3$.

In the same manner, there were prepared calcined powders of $CaTiO_3$ and $CaZrO_3$, using a mixture of $CaCO_3$ and $TiO_2$ and a mixture of $CaCO_3$ and $ZrO_2$, respectively.

X-ray diffraction patterns for these calcined powders show that they have an uniform crystal structure.

The calcined powders of $BaTiO_3$, $CaTiO_3$ and $CaZrO_3$ were weighed together with powders of $MnO_2$, $BaO$ and $SiO_2$ to prepare a mixture of which the final product has a composition shown in Table 9A. In this table, the underlined values are those beyond the scope of the present invention.

Using the resultant mixture, there were prepared test specimens Nos. 113 to 139 in the same manner as in Example 3 under the same conditions.

COMPARATIVE EXAMPLE 5

Using the same powders of $BaCO_3$, $TiO_2$, $CaCO_3$, $ZrO_2$, $MnO_2$, $BaO$ and $SiO_2$ as those used in Example 5, there was prepared comparative specimen No. 140 having the composition shown in Table 9B in the same manner as in comparative example 3 under the same conditions.

The electrical properties of the test specimens Nos. 113 to 140 were measured in the same manner as in Example 1. Results obtained are shown in Table 10 together with their sintering temperatures ($T_{sin}$) In tables 9A, 9B and 10, the asterisked specimens are those having a composition beyond the scope of the present invention.

TABLE 9A

| No. | Basic composition (mol %) | | | Additives (mol/100 mol) | | |
|---|---|---|---|---|---|---|
| | $BaTiO_3$ | $CaTiO_3$ | $CaZrO_3$ | $MnO_2$ | $BaO$ | $SiO_2$ |
| 113* | 92 | 3 | 5 | 1.0 | 2.0 | 2.0 |
| 114* | 89 | 10.5 | 0.5 | 1.0 | 2.0 | 2.0 |
| 115* | 82.5 | 16 | 1.5 | 1.0 | 2.0 | 2.0 |
| 116* | 81 | 12 | 7 | 1.0 | 2.0 | 2.0 |
| 117* | 83 | 7 | 10 | 1.0 | 2.0 | 2.0 |
| 118* | 96 | 2 | 2 | 1.0 | 2.0 | 2.0 |
| 119 | 93 | 6 | 1 | 1.0 | 2.0 | 2.0 |
| 120 | 85 | 14 | 1 | 1.0 | 2.0 | 2.0 |
| 121 | 82 | 14 | 4 | 1.0 | 2.0 | 2.0 |
| 122 | 82 | 10 | 8 | 1.0 | 2.0 | 2.0 |
| 123 | 88 | 8 | 4 | 2.0 | 0.5 | 2.0 |
| 124 | 90 | 8 | 2 | 1.0 | 2.0 | 2.0 |
| 125 | 88 | 8 | 4 | 1.0 | 2.0 | 2.0 |
| 126 | 88 | 8 | 4 | 2.0 | 1.0 | 2.0 |
| 127* | 88 | 8 | 4 | 0 | 2.0 | 2.0 |
| 128 | 88 | 8 | 4 | 0.1 | 2.0 | 2.0 |
| 129 | 88 | 8 | 4 | 4.0 | 2.0 | 2.0 |
| 130* | 88 | 8 | 4 | 8.0 | 2.0 | 2.0 |
| 131* | 88 | 8 | 4 | 1.0 | 0 | 2.0 |
| 132 | 88 | 8 | 4 | 1.0 | 0.2 | 2.0 |
| 133 | 88 | 8 | 4 | 1.0 | 4.0 | 2.0 |
| 134* | 88 | 8 | 4 | 1.0 | 8.0 | 2.0 |
| 135* | 88 | 8 | 4 | 1.0 | 2.0 | 0 |
| 136 | 88 | 8 | 4 | 1.0 | 2.0 | 0.1 |
| 137 | 88 | 8 | 4 | 1.0 | 2.0 | 3.0 |
| 138* | 88 | 8 | 4 | 1.0 | 2.0 | 5.0 |
| 139 | 88 | 7 | 5 | 1.0 | 2.0 | 2.0 |

TABLE 9B

| | $\{(Ba_{1-x}Ca_x)O\}_m(Ti_{1-y}Zr_y)O_2$ | | | | | Additives (mol/100 mol) | |
|---|---|---|---|---|---|---|---|
| | | Ba | Ca | Ti | Zr | | |
| No. | m | 1 − x | x | 1 − y | y | $MnO_2$ | $SiO_2$ |
| 140* | 1.02 | 0.91 | 0.09 | 0.95 | 0.05 | 1.0 | 2.0 |

TABLE 10

| No. | $T_{sin}$ (°C.) | Dielectric constant, ε | tan δ (%) | ΔC/C$_{25}$ (%) −55° C. | ΔC/C$_{25}$ (%) +125° C. | ΔC/C° (%) −25° C. | ΔC/C° (%) 85° C. | Specific resistance (Ωcm) |
|---|---|---|---|---|---|---|---|---|
| 113* | 1360 | 3472 | 0.98 | −29.0 | +3.5 | −17.6 | −7.8 | 1.1 × 10¹³ |
| 114* | 1300 | 3336 | 0.91 | −23.1 | +12.3 | −15.4 | −7.2 | 6.4 × 10¹² |
| 115* | 1330 | 2308 | 0.85 | −13.2 | +3.1 | −8.5 | +1.7 | 5.4 × 10¹² |
| 116* | 1360 | 2366 | 0.63 | −11.1 | −4.8 | −7.2 | −8.5 | 7.1 × 10¹² |
| 117* | 1300 | 2278 | 0.59 | −8.3 | −5.4 | −3.8 | −9.7 | 8.9 × 10¹² |
| 118* | 1360 | 3481 | 0.84 | −24.6 | −0.4 | −16.7 | −4.1 | 8.5 × 10¹² |
| 119 | 1270 | 3425 | 0.95 | −14.8 | +12.5 | −9.4 | +4.4 | 9.5 × 10¹² |
| 120 | 1300 | 3057 | 0.84 | −13.4 | +0.9 | −9.0 | −8.9 | 1.0 × 10¹³ |
| 121 | 1330 | 3014 | 0.77 | −4.8 | −4.2 | −4.1 | −3.7 | 8.4 × 10¹² |
| 122 | 1270 | 3077 | 0.51 | −4.2 | +4.3 | −2.8 | +9.5 | 9.7 × 10¹² |
| 123 | 1330 | 3429 | 0.96 | −13.5 | −0.4 | −6.2 | −8.2 | 8.1 × 10¹² |
| 124 | 1270 | 3340 | 0.82 | −12.6 | +11.5 | −8.6 | +4.2 | 4.6 × 10¹² |
| 125 | 1300 | 3019 | 0.77 | −7.7 | −0.5 | −6.9 | −9.8 | 7.8 × 10¹² |
| 126 | 1330 | 3269 | 0.74 | −8.6 | −0.1 | −4.5 | −7.4 | 8.3 × 10¹² |
| 127* | 1330 | 2870 | 0.71 | −31.5 | −8.4 | −25.1 | −4.9 | 1.2 × 10¹³ |
| 128 | 1270 | 3025 | 0.78 | −14.9 | −6.2 | −9.7 | −4.1 | 1.1 × 10¹³ |
| 129 | 1360 | 3001 | 0.69 | −10.2 | −5.2 | −5.5 | −3.8 | 7.4 × 10¹² |
| 130* | 1270 | 1927 | 0.66 | −8.4 | +1.4 | −5.3 | −2.0 | 8.2 × 10¹² |
| 131* | 1330 | 3572 | 1.14 | −35.8 | −5.1 | −24.3 | −2.7 | 8.6 × 10⁹ |
| 132 | 1300 | 3338 | 0.92 | −14.3 | −5.0 | −5.0 | −7.8 | 6.1 × 10¹² |
| 133 | 1330 | 3039 | 0.83 | −11.2 | −6.7 | −8.7 | −2.5 | 8.0 × 10¹² |
| 134* | 1400 | 1824 | 0.89 | +8.7 | −7.2 | +4.1 | −3.5 | 7.6 × 10¹² |
| 135* | 1360 | 2541 | 0.98 | −24.5 | −5.1 | −16.6 | −2.1 | 7.9 × 10¹² |
| 136 | 1330 | 3186 | 0.78 | −14.7 | −6.9 | −9.2 | −6.4 | 8.1 × 10¹² |
| 137 | 1270 | 3092 | 0.57 | +8.1 | −9.4 | +5.1 | −9.6 | 6.8 × 10¹² |
| 138* | 1330 | 2246 | 0.83 | +17.2 | −21.9 | +10.4 | −23.7 | 7.5 × 10¹² |
| 139 | 1300 | 3451 | 0.81 | −12.5 | +3.2 | −3.6 | −3.6 | 8.4 × 10¹² |
| 140* | 1250 | 1369 | 2.30 | −50.1 | +21.7 | −18.7 | +215.8 | 2.2 × 10¹² |

As can be seen from the results shown in Table 10, the present invention makes it possible to produce dielectric ceramics of a system $BaTiO_3$-$CaTiO_3$-$CaZrO_3$+$MnO_2$+$BaO$+$SiO_2$ having dielectric constant of not less than 3000, dielectric loss of not more than 1.00%, the temperature change rate of capacitance ranging from −15 to 15% in a temperature range of from −55° to +125° C., and the temperature change rate of dielectric constant ranging from −10 to +10% in a temperature range of −25° to +85 ° C.

From the comparison of the results for specimen No. 139 with those for specimen No. 140, it can be seen that the dielectric ceramics produced by the present invention has a small temperature change rate of dielectric constant, while that produced by the method of the prior art is low in dielectric constant and large in temperature change rate of dielectric constant.

EXAMPLE 6

$BaCO_3$ and $TiO_2$ were weighed to prepare a mixture for preparation of $BaTiO_3$, ball-milled to prepare a fully uniform or homogeneous mixture, calcined in air at 1200° C. for 1 hour. The calcined body was crushed and then milled to obtain calcined powder of $BaTiO_3$.

In the same manner, there were prepared calcined powders of $CaTiO_3$, $CaZrO_3$ and $MgTiO_3$, using a mixture of $CaCO_3$ and $TiO_2$, a mixture of $CaCO_3$ and $ZrO_2$, or a mixture of $MgO$ and $TiO_2$, respectively.

X-ray diffraction patterns for these calcined powders show that they have an uniform crystal structure.

The calcined powders of $BaTiO_3$, $CaTiO_3$, $CaZrO_3$ and $MgTiO_3$ were weighed together with powders of $MnO_2$, $BaO$ and $SiO_2$ to prepare a mixture of which the final product has a composition shown in Table 11A. In this table, the underlined values are those beyond the scope of the present invention.

Using the resultant mixture, there were prepared test specimens Nos. 141 to 173 in the same manner as in Example 3 under the same conditions.

COMPARATIVE EXAMPLE 6

Using the same powders of $BaCO_3$, $CaCO_3$, $MgCO_3$, $TiO_2$, $ZrO_2$, $MnO_2$, $BaO$ and $SiO_2$ as those used in Example 6, there was prepared comparative specimen No. 174 having the composition shown in Table 11B in the same manner as in comparative example 3 under the same conditions.

The electrical properties of the test specimens Nos. 141 to 174 were measured in the same manner as in Example 1. Results obtained are shown in Table 12 together with their sintering temperatures ($T_{sin}$) In tables 11A, 11B and 12, the asterisked specimens are those having a composition beyond the scope of the present invention.

TABLE 11A

| No. | Basic composition (mol %) | | | | Additives (mol/100 mol) | | |
|---|---|---|---|---|---|---|---|
| | $BaTiO_3$ | $CaTiO_3$ | $CaZrO_3$ | $MgTiO_3$ | $MnO_2$ | BaO | $SiO_2$ |
| 141* | 91 | 3 | 5 | 1 | 1.0 | 2.0 | 2.0 |
| 142* | 88 | 10.5 | 0.5 | 1 | 1.0 | 2.0 | 2.0 |
| 143* | 81.5 | 16 | 1.5 | 1 | 1.0 | 2.0 | 2.0 |
| 144* | 79 | 13 | 7 | 1 | 1.0 | 2.0 | 2.0 |
| 145* | 83 | 6 | 10 | 1 | 1.0 | 2.0 | 2.0 |
| 146* | 95 | 2 | 2 | 1 | 1.0 | 2.0 | 2.0 |
| 147* | 93.5 | 5.5 | 2.0 | 0 | 1.0 | 2.0 | 2.0 |
| 148 | 93.5 | 5.5 | 1.5 | 0.5 | 1.0 | 2.0 | 2.0 |
| 149* | 83 | 7 | 5 | 5 | 1.0 | 2.0 | 2.0 |
| 150 | 94 | 4 | 1 | 1 | 1.0 | 2.0 | 2.0 |
| 151 | 80 | 12 | 7 | 1 | 1.0 | 2.0 | 2.0 |
| 152 | 83 | 14 | 2 | 1 | 1.0 | 2.0 | 2.0 |
| 153 | 84 | 7 | 8 | 1 | 1.0 | 2.0 | 2.0 |
| 154 | 82 | 10 | 7 | 4 | 1.0 | 2.0 | 2.0 |
| 155 | 90 | 6 | 3.9 | 0.1 | 1.0 | 2.0 | 2.0 |
| 155 | 90 | 6 | 3.9 | 0.1 | 1.0 | 2.0 | 2.0 |
| 156 | 87 | 8 | 4 | 1 | 1.0 | 2.0 | 2.0 |
| 157 | 89 | 7 | 3 | 1 | 1.0 | 2.0 | 2.0 |
| 158 | 88 | 8 | 3.5 | 0.5 | 1.0 | 2.0 | 2.0 |
| 159 | 80.5 | 12.5 | 4 | 3 | 1.0 | 2.0 | 2.0 |
| 160 | 86 | 5 | 6 | 3 | 1.0 | 0.2 | 2.0 |
| 161* | 87 | 7 | 4 | 2 | 0 | 2.0 | 2.0 |
| 162 | 87 | 7 | 4 | 2 | 0.1 | 2.0 | 2.0 |
| 163 | 87 | 7 | 4 | 2 | 4.0 | 2.0 | 2.0 |
| 164* | 87 | 7 | 4 | 2 | 8.0 | 2.0 | 2.0 |
| 165* | 87 | 7 | 4 | 2 | 1.0 | 0 | 2.0 |
| 166 | 87 | 7 | 4 | 2 | 1.0 | 0.2 | 2.0 |
| 167 | 87 | 7 | 4 | 2 | 1.0 | 4.0 | 2.0 |
| 168* | 87 | 7 | 4 | 2 | 1.0 | 8.0 | 2.0 |
| 169* | 87 | 7 | 4 | 2 | 1.0 | 0.2 | 0 |
| 170 | 87 | 7 | 4 | 2 | 1.0 | 2.0 | 0.1 |
| 171 | 87 | 7 | 4 | 2 | 1.0 | 2.0 | 3.0 |
| 172* | 87 | 7 | 4 | 2 | 1.0 | 2.0 | 5.0 |
| 173 | 87 | 7 | 4 | 2 | 1.0 | 1.0 | 1.5 |

TABLE 11B

| | $\{(Ba_{1-x-y}Ca_xSr_y)O\}_m(Ti_{1-z}Ar_z)O_2$ | | | | | Additives (mol/100 mol) | |
|---|---|---|---|---|---|---|---|
| | | Ba | | | | | |
| No. | m | 1 − x − y | Ca x | Mg y | Ti 1 − z | Zr z | $MnO_2$ $SiO_2$ |
| 174* | 1.01 | 0.86 | 0.10 | 0.02 | 0.96 | 0.04 | 1.0  1.5 |

TABLE 12

| No. | $T_{an}$ (°C.) | Dielectric constant, $\epsilon$ | tan δ (%) | ΔC/C$_{25}$ (%) −55° C. | ΔC/C$_{25}$ (%) +125° C. | ΔC/C°(%) −25° C. | ΔC/C°(%) 85° C. | Specific resistance (Ωcm) |
|---|---|---|---|---|---|---|---|---|
| 141* | 1360 | 3335 | 0.96 | −24.4 | +3.7 | −15.1 | −8.2 | 9.7 · 10$^{12}$ |
| 142* | 1300 | 3219 | 0.74 | −21.2 | +10.6 | −14.4 | −5.6 | 6.1 · 10$^{12}$ |
| 143* | 1300 | 2451 | 0.88 | −14.0 | +2.5 | −9.2 | +0.3 | 5.2 · 10$^{12}$ |
| 144* | 1330 | 2207 | 0.64 | −10.1 | −2.0 | −6.3 | −7.8 | 7.0 × 10$^{12}$ |
| 145* | 1360 | 2396 | 0.92 | −13.4 | −5.6 | −8.9 | −5.1 | 8.7 × 10$^{12}$ |
| 146* | 1330 | 3240 | 0.73 | −23.7 | +0.5 | −14.8 | +1.7 | 9.3 × 10$^{12}$ |
| 148* | 1270 | 3492 | 0.70 | −17.8 | +5.2 | −12.0 | −7.5 | 6.6 × 10$^{12}$ |
| 148 | 1330 | 3128 | 0.84 | −13.2 | +3.2 | −9.3 | −6.0 | 6.3 × 10$^{12}$ |
| 149* | 1330 | 2357 | 0.55 | −11.9 | −0.7 | −6.5 | −2.2 | 7.5 × 10$^{13}$ |
| 150 | 1300 | 3496 | 0.89 | −14.7 | +13.1 | −9.5 | +0.3 | 9.8 × 10$^{12}$ |
| 151 | 1330 | 3041 | 0.75 | −5.3 | +7.1 | −3.4 | +7.9 | 9.5 × 10$^{12}$ |
| 152 | 1330 | 3065 | 0.81 | −4.0 | −1.4 | −1.9 | −8.3 | 8.7 × 10$^{12}$ |
| 153 | 1360 | 3002 | 0.88 | −7.4 | −2.3 | −4.0 | −5.7 | 8.1 × 10$^{12}$ |
| 154 | 1360 | 3022 | 0.79 | −6.8 | +9.8 | −3.5 | −8.5 | 5.9 × 10$^{12}$ |
| 155 | 1330 | 3265 | 0.80 | −14.1 | +3.6 | −9.6 | −6.5 | 7.8 × 10$^{12}$ |
| 156 | 1300 | 3379 | 0.88 | −11.5 | +2.2 | −4.7 | −7.1 | 7.7 × 10$^{12}$ |
| 157 | 1270 | 3428 | 0.78 | −12.4 | +7.8 | −7.7 | −2.2 | 5.1 × 10$^{12}$ |
| 158 | 1330 | 3121 | 0.82 | −7.2 | +2.4 | −5.1 | −8.6 | 7.2 × 10$^{12}$ |
| 159 | 1360 | 3083 | 0.82 | −4.1 | +3.4 | −1.9 | −5.2 | 8.1 × 10$^{12}$ |
| 160 | 1330 | 3386 | 0.92 | −8.2 | +3.9 | −4.8 | −9.0 | 6.9 × 10$^{12}$ |
| 161* | 1270 | 2760 | 0.80 | −30.1 | −3.6 | −23.7 | −5.2 | 1.0 × 10$^{13}$ |
| 162 | 1270 | 3006 | 0.63 | −14.5 | −2.8 | −8.3 | −4.0 | 9.9 × 10$^{12}$ |
| 163 | 1300 | 3004 | 0.76 | −7.9 | −0.2 | −4.5 | −7.1 | 7.2 × 10$^{12}$ |
| 164* | 1360 | 2141 | 0.93 | −8.4 | +3.9 | −5.0 | −7.2 | 7.0 × 10$^{12}$ |
| 165* | 1300 | 3480 | 0.97 | −31.3 | +1.7 | −20.2 | −5.1 | 8.3 × 10$^{9}$ |
| 166 | 1270 | 3198 | 0.72 | −14.1 | +3.3 | −6.8 | −4.7 | 3.2 × 10$^{12}$ |
| 167 | 1300 | 3037 | 0.87 | −9.5 | +0.4 | −5.0 | −8.2 | 6.8 × 10$^{12}$ |
| 168* | 1400 | 2342 | 1.26 | +2.4 | −4.6 | +2.2 | −7.6 | 2.4 × 10$^{12}$ |
| 169* | 1360 | 2638 | 0.89 | −22.6 | +3.4 | −14.4 | −8.3 | 5.1 × 10$^{12}$ |
| 170 | 1270 | 3204 | 0.75 | −13.7 | +2.5 | −8.7 | −7.1 | 7.7 × 10$^{12}$ |
| 171 | 1300 | 3010 | 0.84 | +8.9 | −4.2 | +4.8 | −6.5 | 6.8 × 10$^{12}$ |
| 172* | 1330 | 2148 | 0.90 | +19.4 | −20.4 | +10.3 | −19.7 | 8.2 × 10$^{12}$ |
| 173 | 1330 | 3365 | 0.82 | −12.6 | +5.2 | −7.4 | −5.3 | 9.2 × 10$^{12}$ |
| 174* | 1260 | 5876 | 2.93 | −51.5 | −63.0 | −22.6 | −35.3 | 2.4 × 10$^{12}$ |

As can be seen from the results shown in Table 12, the present invention makes it possible to produce dielectric ceramics of a system $BaTiO_3$-$CaTiO_3$-$CaZrO_3$-$MgTiO_3$ +$MnO_2$+$BaO$+$SiO_2$ having dielectric constant of not less than 3000, dielectric loss of not more than 1.00%, the temperature change rate of capacitance ranging from −15 to 15% in a temperature range of from −55° to +125° C., and the temperature change rate of dielectric constant ranging from −10 to +10% in a temperature range of −25° to +85 ° C.

From the comparison of the results for specimen No. 173 with those for specimen No. 174, it can be seen that the dielectric ceramics produced by the present invention has a small temperature change rate of dielectric constant, while that produced by the method of the prior art is low in dielectric constant and large in temperature change rate of dielectric constant.

What I claim is:

1. A method for producing non-reducible dielectric ceramics of the kind comprising a basic composition of a three component system $BaTiO_3$-$CaTiO_3$-$CaZrO_3$ or of a four component system $BaTiO_3$-$CaTiO_3$-$CaZrO_3$-$MgTiO_3$ and containing additives composed of at least manganese oxide and silicon dioxide, the method comprising the steps of providing separately prepared calcined powders of at least three perovskite compounds including $BaTiO_3$, $CaTiO_3$ and $CaZrO_3$, and when the four component system is being produced also $MgTiO_3$, mixing said calcined powders to prepare a mixture for a basic composition, adding additives composed of at least manganese oxide and silicon dioxide to said mixture for the basic composition, and then firing the resultant mixture in a reducing atmosphere.

2. A method for producing non-reducible dielectric ceramics according to claim 1 wherein said dielectric ceramics consists essentially of a basic composition of a ternary system $BaTiO_3$-$CaTiO_3$-$CaZrO_3$, and additives composed of manganese oxide and silicon dioxide, said basic composition consisting essentially of 82.0 to 93.0 mole % of $BaTiO_3$, 6.0 to 14.0 mole % of $CaTiO_3$ and 1.0 to 8.0 mole % of $CaZrO_3$, the respective added amounts of said additives per 100 parts by mole of said mixture for the basic composition being 0.1 to 4.0 parts by mole for manganese oxides in terms of $MnO_2$, and 0.1 to 3.0 parts by mole for silicon dioxide.

3. A method for producing non-reducible dielectric ceramics according to claim 2 wherein the $BaTiO_3$ has a molar ratio of BaO to $TiO_2$ within the range of 1.002 to 1.05.

4. A method for producing non-reducible dielectric ceramics according to claim 1 wherein said dielectric ceramics consists essentially of a basic composition of a ternary system $BaTiO_3$-$CaTiO_3$-$CaZrO_3$, and additives composed of manganese oxide, silicon dioxide and magnesium oxide, said basic composition consisting essentially of 82.0 to 93.0 mole % of $BaTiO_3$, 6.0 to 14.0 mole % of $CaTiO_3$ and 1.0 to 8.0 mole % of $CaZrO_3$, the respective added amounts of said additives per 100 parts by mole of said mixture for the basic composition being 0.1 to 4.0 parts by mole for manganese oxides in terms of $MnO_2$, 0.1 to 3.0 parts by mole for silicon dioxide, and 0.2 to 4.0 parts by mole for MgO.

5. A method for producing non-reducible dielectric ceramics according to claim 1 wherein said dielectric ceramics consists essentially of a basic composition of a ternary system $BaTiO_3$-$CaTiO_3$-$CaZrO_3$ and additives composed of manganese oxide, silicon dioxide and calcium oxide, said basic composition consisting essentially of 82.0 to 93.0 mole % of $BaTiO_3$, 6.0 to 14.0 mole % of $CaTiO_3$ and 1.0 to 8.0 mole % of $CaZrO_3$, the respective added amounts of said additives per 100 parts by mole of said mixture for the basic composition being 0.1 to 4.0 parts by mole for manganese oxides in terms of $MnO_2$, 0.1 to 3.0 parts by mole for silicon dioxide, and 0.2 to 4.0 parts by mole for CaO.

6. A method for producing non-reducible dielectric ceramics according to claim 1 wherein said dielectric ceramics consists essentially of a basic composition of a ternary system $BaTiO_3$-$CaTiO_3$-$CaZrO_3$, and additives composed of manganese oxide, silicon dioxide and strontium oxide, said basic composition consisting essentially of 82.0 to 93.0 mole % of $BaTiO_3$, 6.0 to 14.0 mole % of $CaTiO_3$ and 1.0 to 8.0 mole % of $CaZrO_3$, the respective added amounts of said additives per 100 parts by mole of said mixture for the basic composition being 0.1 to 4.0 parts by mole for manganese oxides in terms of $MnO_2$, 0.1 to 3.0 parts by mole for silicon dioxide, and 0.2 to 4.0 parts by mole for SrO.

7. A method for producing non-reducible dielectric ceramics according to claim 1 wherein said dielectric ceramics consists essentially of a basic composition of a ternary system $BaTiO_3$-$CaTiO_3$-$CaZrO_3$, and additives composed of manganese oxide, silicon dioxide and barium oxide, said basic composition consisting essentially of 82.0 to 93.0 mole % of $BaTiO_3$, 6.0 to 14.0 mole % of $CaTiO_3$ and 1.0 to 8.0 mole % of $CaZrO_3$, the respective added amounts of said additives per 100 parts by mole of said mixture for the basic composition being 0.1 to 4.0 parts by mole for manganese oxides in terms of $MnO_2$, 0.1 to 3.0 parts by mole for silicon dioxide, and 0.2 to 4.0 parts by mole for BaO.

8. A method for producing non-reducible dielectric ceramics according to claim 1 wherein said dielectric ceramics consisting essentially of a basic composition of a four component system $BaTiO_3$-$CaTiO_3$-$CaZrO_3$-$MgTiO_3$, and containing, as additives, manganese oxide, silicon dioxide and barium oxide, said basic composition consisting essentially of 80.0 to 94.0 mole % of $BaTiO_3$, 4.0 to 14.0 mole % of $CaTiO_3$, 1.0 to 8.0 mole % of $CaZrO_3$ and 0.1 to 4.0 mole % of $MgTiO_3$, the respective added amount of said additives per 100 parts by mole of a mixture for a basic composition being 0.1 to 4.0 parts by mole for manganese oxides in terms of $MnO_2$, 0.1 to 3.0 parts by mole for silicon dioxide, and 0.2 to 4.0 parts by mole for barium oxide.

9. A method for producing a non-reducible dielectric ceramic according to claim 1 which comprises separately preparing calcined powders of the individual components of the base composition by calcining each mixture of raw materials in air.

10. A method for producing a non-reducible dielectric ceramic according to claim 2 which comprises separately preparing calcined powders of the individual components of the base composition by calcining each mixture of raw materials in air.

11. A method for producing a non-reducible dielectric ceramic according to claim 3 which comprises separately preparing calcined powders of the individual components of the base composition by calcining each mixture of raw materials in air.

12. A method for producing a non-reducible dielectric ceramic according to claim 4 which comprises separately preparing calcined powders of the individual components of the base composition by calcining each mixture of raw materials in air.

13. A method for producing a non-reducible dielectric ceramic according to claim 5 which comprises separately preparing calcined powders of the individual components of the base composition by calcining each mixture of raw materials in air.

14. A method for producing a non-reducible dielectric ceramic according to claim 6 which comprises separately preparing calcined powders of the individual components of the base composition by calcining each mixture of raw materials in air.

15. A method for producing a non-reducible dielectric ceramic according to claim 7 which comprises separately preparing calcined powders of the individual components of the base composition by calcining each mixture of raw materials in air.

16. A method for producing a non-reducible dielectric ceramic according to claim 8 which comprises separately preparing calcined powders of the individual components of the base composition by calcining each mixture of raw materials in air.

* * * * *